United States Patent [19]

Rothwell et al.

[11] Patent Number: 4,955,800
[45] Date of Patent: Sep. 11, 1990

[54] APPARATUS FOR PRODUCING PREFABRICATED FOAM-INSULATED WALLS

[75] Inventors: Terrence M. Rothwell, Morrefield; George P. Rothwell, Mount Forest, both of Canada

[73] Assignee: Tampa-Hall Limited, Ontario, Canada

[21] Appl. No.: 315,056

[22] Filed: Feb. 23, 1989

Related U.S. Application Data

[63] Continuation-in-part of Ser. No. 86,459, Aug. 18, 1987, abandoned.

[30] Foreign Application Priority Data

Aug. 14, 1987 [CA] Canada .................................. 544,621

[51] Int. Cl.⁵ .............................................. B29C 29/10
[52] U.S. Cl. ......................................... 425/63; 249/15; 249/20; 264/46.5; 264/46.6; 425/117; 425/817 R
[58] Field of Search .................... 425/63, 65, 117, 125, 425/817 R; 249/15, 19, 20, 33; 264/33–35, 46.6

[56] References Cited

U.S. PATENT DOCUMENTS

| 827,712 | 8/1906 | Daniel | 249/15 |
| 1,368,131 | 2/1921 | Fluor | 249/20 |
| 1,460,197 | 6/1923 | George | 249/20 |
| 3,590,448 | 7/1971 | Bryant | 425/63 |
| 3,697,207 | 10/1972 | Ordgvst | 425/63 |
| 3,754,066 | 8/1973 | Black | 249/20 |
| 4,040,774 | 8/1977 | Scheller | 249/20 |
| 4,372,733 | 2/1983 | Tinning | 425/63 |

Primary Examiner—James C. Housel
Attorney, Agent, or Firm—Gowling, Strathy & Henderson

[57] ABSTRACT

An apparatus for producing foam-filled stud walls. The apparatus has a main frame, including a substantially vertical backplate against which the sheathing bears, a carrier unit moveable vertically on the main frame, and a dam carried on the carrier unit parallel to the backplate, moveable towards and away from the backplate. Hydraulic actuators are located between the carrier unit and main frame, and between the dam and the carrier unit, to hold the dam against the stud wall when the stud wall is positioned with its sheathing against the backplate, and to move the carrier unit and thus the dam vertically while it is so held against the stud wall.

5 Claims, 4 Drawing Sheets

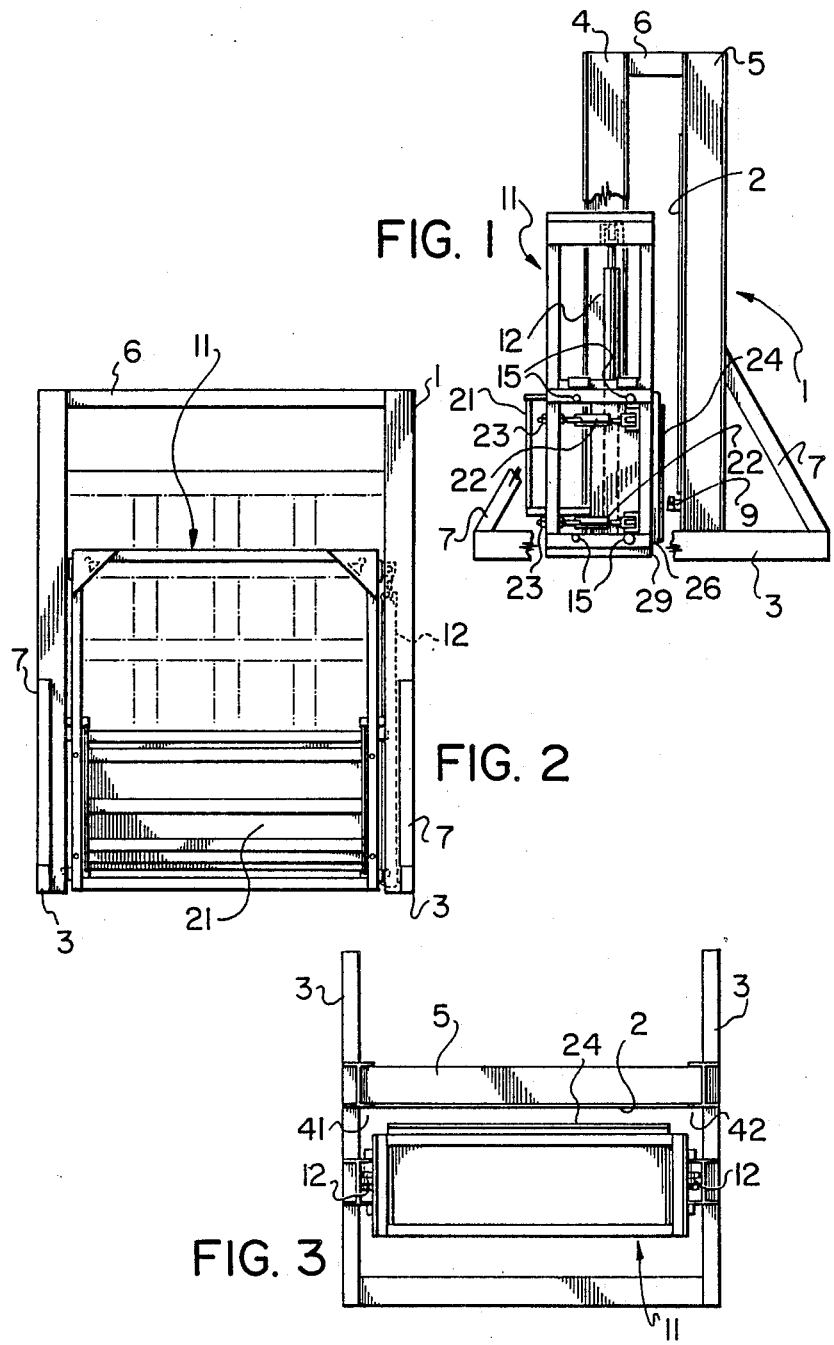

APPARATUS FOR PRODUCING PREFABRICATED FOAM-INSULATED WALLS

RELATED APPLICATION

This application is a continuation-in-part of application No. 086,459, filed Aug. 18, 1987, now abandoned.

BACKGROUND OF THE INVENTION

This invention relates to a method of producing foam-filled stud walls, and to apparatus for implementing the method.

It has long been known that a foam-filled wall is very desirable from an insulation (i.e. heat transfer) viewpoint, and various methods have been used in the past to produce such walls.

No suitable method or apparatus has yet been developed to facilitate rapid and efficient prefabrication of such walls on an assembly-line basis. The present invention is directed towards providing a suitable assembly line method and apparatus for implementing the method for producing prefabricated foam-filled walls.

The type of wall intended to be filled is the type commonly used in wood frame construction, i.e. a wall having a base plate, a top plate, window and door openings, and a number of spaced vertical studs, the plates and studs most commonly being either nominal two-by-four or two-by-six lumber. However, this invention is not limited either to specific stud sizes or spacings, nor to any specific stud material.

In the prior art, urethane insulation has been applied on site to standing stud walls, typically by spraying a spray-type foam onto the wall and building up an insulating layer roughly an inch at a time. As spray-type foams are highly exothermic, the layers of insulation must be built up gradually. This type of system is generally cumbersome, messy, and may produce an uneven surface with no certainty that all voids, including corner cavities, are filled.

Another attempted solution in the prior art has been to inject measured amounts of foam between panels, but this is difficult or impossible to do in the case of prefabricated stud walls, especially when dealing with varying wall sizes. Injecting an incorrect amount of foam may result either in voids in the insulation, or in the wall being forced apart by the expanding foam. The latter problem may possibly be avoided by utilizing a full press on both sides of the wall, but in addition to requiring more elaborate equipment, this also means that non-standard wall sizes cannot be readily accommodated, nor can window openings and the like.

In the prior art, various types of equipment have been used for injecting foam into double-membrane panels, such as those found in metal garage doors, for example. Such systems suffer from a number of serious drawbacks which prevent or severely restrict their applicability to stud walls. These drawbacks include the fact that a complete filling may not take place, and may not even be possible, if the panel includes window and door openings. Another serious problem with this type of system is that, since both front and rear panels must be in place to contain the foam, either a finished interior surface, or a superfluous interior panel (to be covered later by a finished surface), must be provided. If a finished interior surface such as gypsum board or "drywall" is installed at the plant location, further handling of the panel is made far more difficult. This type of panel would not only weigh more, but would need to be handled with great care in order to avoid damaging the finished surface.

A method for producing a prefabricated insulated wall panel is disclosed in U.S. Pat. No. 4,409,768 granted to Boden in October 1983. The preferred embodiment of this invention employs multiple dams to contain the foam introduced into a wall. The patent also discloses the use of a single dam to cover the area to be filled. Boden does not, however, introduce a half-completed stud wall into an apparatus comprising a backplate and a moveable dam. He rather lays his stud wall onto a backplate and then lays a series of plates upon the stud wall. There is thus no point at which the stud wall is inserted between a dam and a backplate. Boden does also not contemplate the moving of a single dam along a stud wall progressively as the foam sets. He is more likely to use a single plate which covers the entire area to be filled.

A method for insulating walls is disclosed in U.S. Pat. No. 4,093,411, granted to Lee in June 1978. Lee teaches a process for covering a surface with foam. Lee does not introduce a wall between a backplate and a dam, but rather translates his machine along a surface. Moreover, he does not advance a dam towards the bottom portion of the open side of the stud wall to a predetermined distance from the backplate. This movement of the dam ensures that, if the studs are warped or vary in width, they will be forced back into contact with the front surface of the sheathing backplate to ensure that the foam does not escape between the rear surface of the stud and the backplate, and uniformity of the front of the studs to ensure that the foam does not exude between the dam and the studs.

Lee discloses an apparatus having a continuous or endless belt, and does not suggest the use of a single plate moved along the stud wall in discrete steps with a delay between such steps to allow for setting of the foam. It should be noted that although Lee shows a pressure plate behind the belt, it merely serves to limit the expansion of the foam, and has no means for urging it into contact with underlying studs so as to straighten any misalignment or to adjust for varying thickness.

It is highly desirable to have a method and apparatus which permits the filling not only of uniform size wall sections without window openings or the like, but also the filling of varying sizes of wall sections with varying sizes and locations of window openings. It is also highly desirable to have a method and apparatus which permits the filling of walls without requiring the presence of any interior panel, finished or otherwise.

SUMMARY OF THE INVENTION

The present invention is therefore aimed at producing an insulation-filled stud wall which has one open side, namely the interior side. During the process of manufacture, a half-completed stud wall is introduced into an apparatus comprising a backplate and a moveable dam. The stud wall is backed with any suitable exterior sheathing, such as asphalt impregnated fiber board. As will be explained in greater detail herein, a foam or foam-forming mixture is introduced between the sheathing and the dam which is temporarily positioned against the interior side of the studs. The foam or foam-forming mixture is introduced by a "spray-pour" method. In this type of method, a pour-type urethane foam is sprayed between the exterior sheathing and the dam using a conventional spray nozzle to atomize the foam. The foam is then permitted to rise freely between the sheathing and the same and is allowed to set. After allowing sufficient setting time to elapse, the dam is moved to the next unfilled section of the stud wall and the next batch of foam or foam-forming mixture is introduced into the wall. The wall can therefore be filled in a series of spray-pours.

In accordance with the present invention, a machine is provided for filling a sheathing-backed, one-side-open stud wall with foam. The machine comprises a main frame, including a substantially vertical backplate against which the sheathing bears; a dam parallel to the backplate, moveable towards and away from and vertically with respect to the backplate; a means for holding the dam against the stud wall when the stud wall is positioned with its sheathing against the backplate; and a means for moving the dam vertically while it is so held against the stud wall. One side between the backplate and the dam constitutes a stud wall entrance area and the other side constitutes a stud wall exit area. A stud wall may be introduced at the entrance area and positioned between the backplate and the dam. The dam may then be moved against the bottom portion of the open side of the stud wall and held there. Foam may then be introduced between the backplate and the dam to fill the stud wall therebetween. After a predetermined time has been allowed for the foam to set, the dam may be moved upwardly, additional foam may then be introduced to fill a higher portion of the stud wall, and so on to completion of filling. Once the stud wall is filled the dam may be moved away from the backplate, and the filled portion of the stud wall may then be advanced towards the exit area.

In the present invention, at least a portion of an unfilled sheathing-backed stud wall is inserted between a backplate and a dam. The stud wall is introduced in such a manner than the sheathing lies against the backplate and the dam straddles at least two studs of the stud wall. The dam is mounted for movement towards and away from the backplate, the movement being substantially parallel to the backplate. The dam is urged against the bottom portion of the open side of the stud wall and against any resistance due to nonlinearity or misalignment of the studs, to a predetermined distance from the backplate, so as to trap the studs between the dam and the backplate. The movement of the dam relative to the backplate ensures that if the studs are warped or vary in width, they will be forced back into contact with the front surface of the sheathing backplate to ensure that the foam does not escape from between the rear surface of the stud and the backplate. The movement also ensures uniformity of the front of the studs which ensures that the foam does not exude between the dam and the studs.

A foam or a foam-forming mixture is introduced between the sheathing and the dam to fill the portion of the stud wall therebetween with foam. A predetermined setting time for the foam is allowed to elapse before the dam is moved along the stud wall to dam a different unfilled portion of the wall.

The steps of the process from the introduction of the foam to the movement of the dam are repeated until the wall is completely filled. The dam is then withdrawn from the stud wall and the filled portion of the wall is removed from between the backplate and the dam.

In accordance with one embodiment of the invention, there is provided a method for filling a sheathing backed one-side-open stud wall with foam. The method comprises the steps of:

a. introducing at least a portion of the unfilled stud wall between a substantially vertical backplate and a substantially vertical dam, with the sheathing against the backplate, and such that the dam straddles at least two studs;

b. moving the dam towards the bottom portion of the open side of the stud wall to a predetermined distance from said backplate;

c. introducing a foam or foam-forming mixture between the sheathing and the dam to fill the stud wall therebetween with foam;

d. moving the dam upwardly to expose the foam after a predetermined setting time;

e. introducing additional foam or foam-forming mixture to fill a higher portion of the stud wall with foam;

f. repeating steps d and e on to completion of filling;

g. moving the dam away from the stud wall; and h. advancing the filled portion of the stud wall from between the backplate and the dam.

In accordance with another embodiment of the invention there is provided a method of filling a sheathing backed, one-side open stud wall with foam, said method comprising the steps of:

a. introducing at least a portion of the unfilled stud wall between a backplate and a dam mounted for movement towards and away from said backplate and parallel to said backplate, with the sheathing against the backplate, and such that the dam straddles at least two studs of said stud wall;

b. urging the dam against the bottom portion of the open side of the stud wall and against any resistance due to nonlinearity or misalignment of said studs so as to trap said studs between said dam and said backplate;

c. introducing a foam or foam-forming mixture between the sheathing and the dam to fill the said portion of the stud wall therebetween with foam;

d. allowing a predetermined setting time and moving the dam along said two studs to dam a different unfilled portion of the stud wall;

e. repeating steps c and d until completion of filling;

f. retracting the dam from the stud wall; and g. removing the filled portion of the stud wall from between said backplate and said dam.

Further features of the invention will be described or will become apparent in the course of the following detailed description.

BRIEF DESCRIPTION OF THE DRAWINGS

In order that the invention may be more clearly understood, the preferred method and the preferred embodiment of the apparatus will now be described in detail by way of example, with reference to the accompanying drawings, in which:

FIG. 1 is a side view of the apparatus;

FIG. 2 is a front view of the apparatus;

FIG. 3 is a top view of the apparatus;

DETAILED DESCRIPTION OF THE PREFERRED EMBODIMENT

Figure 4A:
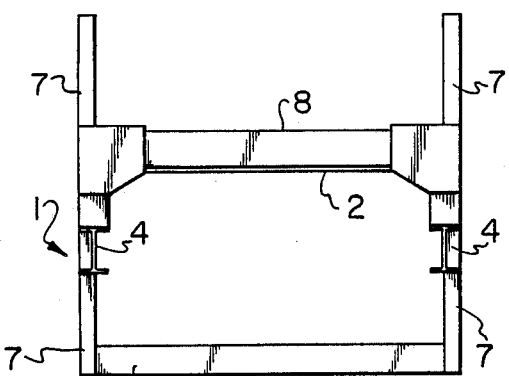
FIGS. 4a, 4b and 4c are top, front and side views respectively of the main frame of the apparatus.

Referring to the drawings, the preferred embodiment of the apparatus of the invention has a main frame 1, including a vertical backplate 2 against which the sheathing bears. A carrier unit 11 moves up and down on the main frame 1, and carries a dam assembly 21 which is moveable towards and away from the backplate 2. The dam assembly 21 includes a dam 24 parallel to the backplate 2. Holding means are provided for holding the dam assembly 21 and thus the dam 24 at a specified distance from the backplate 2, via hydraulic cylinders 22 which have threaded (and therefore adjustable) end-mounts 23. The carrier unit 11, and thus the dam assembly 21 and dam 24, can be repositioned vertically while the dam assembly 21 is held in its horizontal position, by virtue of hydraulic lift cylinders 12 between the main frame 1 and the carrier unit 11. Eight cam bearings 15 guide the carrier unit 11 on the front vertical columns 4 of the main frame 1.

Figure 4B:
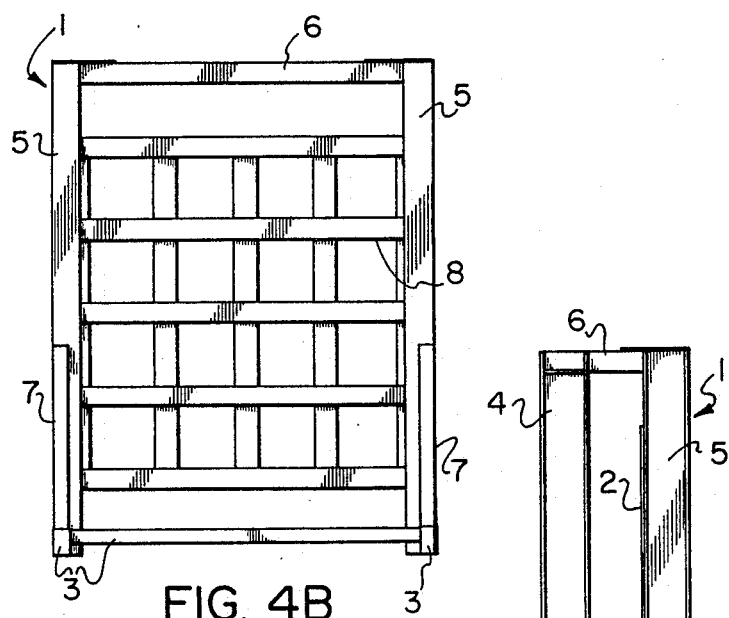
Figure 4C:
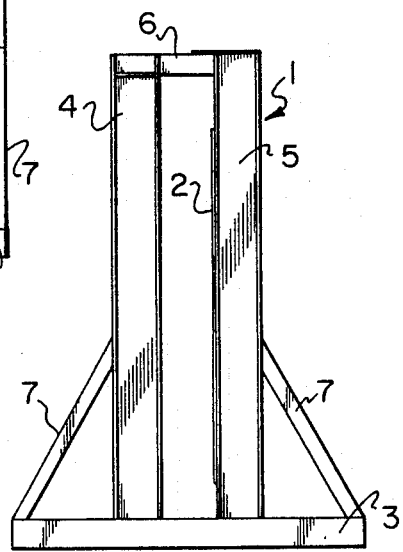

The main frame, shown most clearly in FIGS. 4a, 4b and 4c, comprises a base 3, two front vertical columns 4, two rear vertical columns 5, top cross beams 6 connecting the front and rear vertical columns, brace members 7 for the front and rear vertical columns, and a series of crosspieces 8 between the two rear vertical columns 5, to support the backplate 2 (not shown in FIG. 4b).

Figure 5A:
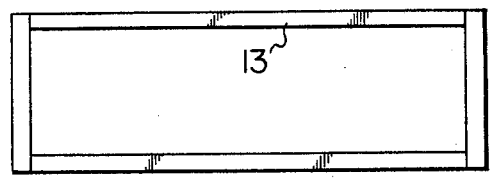
FIGS. 5a, 5b and 5c are top, front and side views respectively of the carrier unit on the apparatus.
Figure 5B:
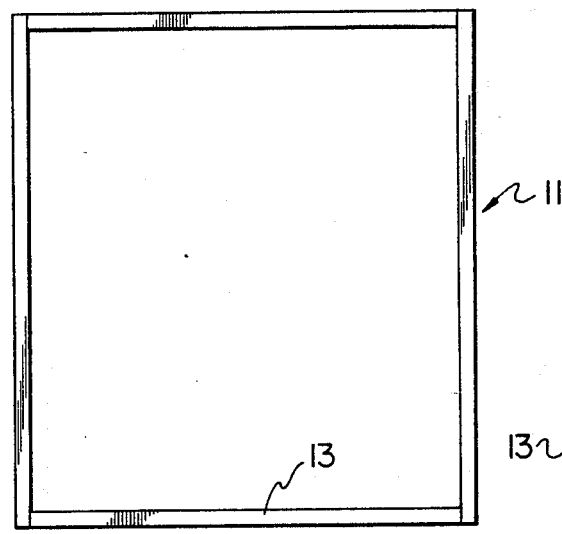
Figure 5C:
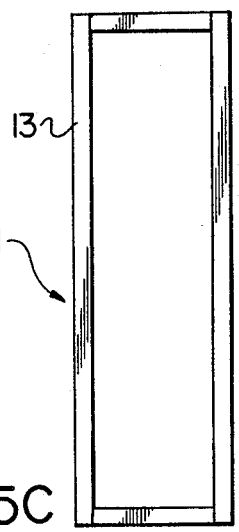

The carrier unit 11, shown most clearly in FIGS. 5a, 5b and 5c, comprises an open box frame 13. The upper side members of the frame 13 include mounting points 14 for the hydraulic lift cylinders 12, which are attached at their lower ends to the base 3 of the main frame 1. There are two lift cylinders 12, one at each end of the carrier unit 11.

Figure 6A:
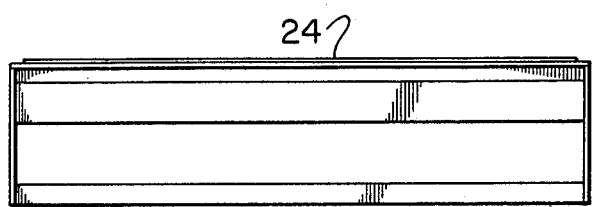
FIGS. 6a, 6b and 6c are top, front and side views respectively of the dam assembly of the apparatus.
Figure 6B:
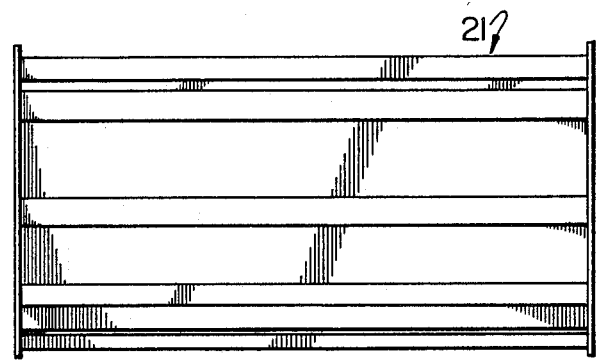
Figure 6C:
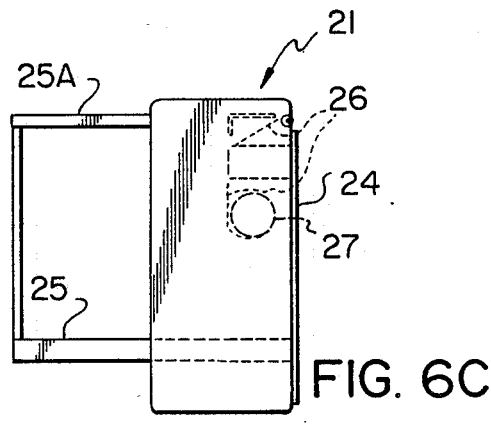

The dam assembly 21, shown in FIGS. 6a, 6b and 6c, comprises th dam 24 and a work platform 25, with safety rail 25a. Mounted on the work platform are various controls to be described later. The dam 24 itself is approximately 36 inches high by 74 inches wide in the preferred embodiment.

It is important that the dam be held in position against the studs in order to ensure uniform applied pressure throughout its frontal area.

The invention is therefore designed either to apply constant jig pressure by means of regulated hydraulic pressure, or preferably, to prevent the advance of the dam past a pre-set dimension (about 4 inches on a 2×4 stud wall). This distance should preferably be adjustable to a close tolerance at each corner of the dam to suit the material being used. This is accomplished by the use of four hydraulic cylinders 22.

Hydraulic actuation is used in the preferred embodiment, but it should be understood that pneumatic or other suitable actuation could be used if desired.

The four cylinders 22 have a threaded adjustment 23 at the back end of the cylinder so that the cylinder may be fully extended when the desired wall thickness is achieved. With this "limited travel" design, the amount of total force is not critical as long as it exceeds the force of the expanding foam, since the advance of the cylinders is restricted so as to prevent undue crushing or compressing of either the sheathing or stud components of the wall. Preferably, the design range of adjustment is sufficient to accommodate wall thickness from 3 inches to 7 inches so that walls made from 2×3, 2×4, or 2×6 can be manufactured.

The design preferably includes a pneumatic accumulator with an adjustable unloading valve rather than a dead-weight accumulator. This is easier to adjust although not as constant loading.

The opening at one side between the backplate 2 and the dam 24 constitutes a stud wall entrance area 41, and the other side constitutes a stud wall exit area 42. A stud wall, comprising a base plate, a top plate,, spaced studs, window and door openings, bearing headers, and exterior sheathing is introduced at the entrance area 41 and positioned between the backplate 2 and the dam 24, supported on rollers 9. The stud wall is positioned in such a manner that the dam 24 straddles at least two studs. In the stud wall, provision for wiring may be made before filling, by positioning switch and receptacle boxes as desired and running conduit to them, the conduit in each case passing down through an opening in the base plate. Alternatively, passageways and openings for wiring and receptacle switch boxes may be mechanically excavated in the foam once the cavity has been filled.

The dam 24 is then moved towards the bottom portion of the open side of the stud wall and against any resistance due to nonlinearity or misalignment of the studs, to a predetermined distance from said backplate, so as to trap the studs between the dam and the backplate 2. The dam 24 is held at that distance from the backplate 2.

A foam or a foam-forming mixture is then "spray-poured" between the sheathing and the dam 24 by a worker standing on the work platform 25. The foam or foam-forming mixture is manually sprayed into the wall by extending the spray gun past the top edge of the dam 24. This area of the stud wall is filled to an intended depth of approximately 1.5 feet. After allowing a predetermined one-minute setting time, the dam 24 is moved upwardly approximately 1.5 feet to expose the set foam. Foam or foam-forming the mixture is then introduced into the unfilled portion of the stud wall which is straddled by the dam. The steps of introducing the foam, waiting for the foam to set, and then moving the dam, are repeated until the wall is filled. The dam 24 is stopped approximately two inches short of the top of the wall for the final spray-pour. This allows any excess foam to rise out of the opening. The same procedure is used for under window openings, the dam being stopped approximately two inches short of the bottom plate of the window opening. The excess in each case is then trimmed off.

The step of introducing a foam or foam-forming mixture in this method of filling a stud wall with foam, comprises atomizing a pour-type foam. The foams presently used are rigid polyurethane foams such as those sold by Stanchem C.I.L. as experimental products nos. 240 NC and 12-129/1X. While rigid polyurethane foam is presently preferred, the application of the present invention is not limited to the specific type of foam to be employed.

So that the surface of the dam 24 does not scrape against the foam as it is elevated, and so that the foam is prevented from adhering to the dam, an eighty mil polyethylene sheet 26 is positioned between the dam 24 and stud wall. One end is attached to a bar 29 running across between the base members of the main frame 1 and the other is spring-wound onto a roll 27. The polyethylene is thus unrolled as the dam 24 rises, and is retrieved on the roll as the dam descends.

Once the stud wall is filled, the dam 24 is disengaged and moved away from the backplate 2, the carrier unit 11 is lowered, and the wall is moved along through the apparatus in the direction of the exit area 42 until it reaches the next section of stud wall to be filled. The maximum width which can be filled in any series of spray-pours depends on the width of the dam 24. The width of the dam can be varied at the design stage to suit the desired throughput of the machine.

In the preferred embodiment, any width up to the 74 inch width of the dam can thus be filled. Any height (depth of spray-pour) can be accommodated from zero to the top of the dam at the top of its travel (96 inches in the preferred embodiment).

The preferred method therefore comprises the steps of introducing a sheathing backed, unfilled stud wall between the backplate 2 and the dam 24, urging the dam 24 towards the bottom portion of the open side of the stud wall and holding it at that distance from the backplate 2; introducing foam or a foam-forming mixture between the sheathing and the dam 24 to fill the cavity therebetween; allowing a predetermined setting time to elapse; moving the dam 24 along two studs to dam a different unfilled portion of the stud wall; introducing foam or foam-forming mixture to fill this section of the stud wall; repeating the three immediately preceding steps until the stud wall is filled; releasing the dam 24 and retracting it from the backplate 2; removing the filled portion of the stud wall from between the backplate and the dam and moving the same towards the exit area 42.

There is normally no provision made for plumbing, as this would usually be positioned on the interior walls of the structure. The same techniques as those used for electrical wiring could be used for installing plumbing.

Suitable controls are provided for raising and lowering the dam. A number of fail-safe devices, as subsequently described in more detail, are provided to ensure operator safety.

The hydraulic system (not illustrated) uses a tandem hydraulic pump which consists of two separate pumps housed in a common housing and driven by one 5 horsepower electric motor. This allows independent operation of two hydraulic systems "A" and "B", without adverse interaction between the two. All components are rated at 1,800 psi or more and have a 4 to 1 safety margin to absorb shock loads, etc.

System A involves one three-position control valve to operate the lift cylinders 12. The valve is electric solenoid controlled from the operator's platform. The two lift cylinders are protected in a "fail safe" mode by pilot-operated check valves "solid connected" to the bottom port. This prevents the cylinders from lowering either by accident or line failure. The platform can only be lowered when "powered down" with the pump operating and the solenoid valve engaged. There is a flow control valve on the raise side of the cylinders that allows the lift speed to be varied from zero to its maximum of 2" per second. The lowering speed is fixed at 3.9" per second. The lift mechanism has a possible lift capacity of 17,000 pounds however the normal lift is expected to be about 6,000 lbs.

System B involves an unloading valve and accumulator providing a constant (adjustable) force on the dam which can be limited by the unloading valve adjustment to a value between 12,000 and 22,000 pounds force. The dam is advanced by a "two-handed" pair of push buttons (i.e., for safety, controls which can only be activated by the operator using both hands on the buttons) until a limit switch at the fully extended position bypasses the advance buttons and holds the dam in its advanced position. If the push buttons are released during the advancing mode, the dam will return to its full open position. The dam is normally returned by a separate return push button. An indicator light will monitor the position of the dam. The speed of the dam is approximately 1 inch per second advance and approximately 1.4 inches per second return. There is no provision to stop the dam and hold it at any position other than fully advanced or fully returned.

The electrical system is controlled from a control panel mounted on the operator's work platform 25. The panel includes the following switches and indicator lights:

Main pump relay switch: This switch starts the hydraulic power unit and lights an indicator light. The power unit can also be turned on and off at the unit.

Control power switch: This switch activates the control switches that are used by the operator, also shows on an indicator light.

"Raise-lower" switch: Three position toggle switch that will raise or lower the platform and dam. Limit switches stop unit at top and bottom.

Dam safety switches: Forward movement of the dam is controlled by two push buttons, requiring operator's two hands to move the dam forward. When the dam is fully extended an indicator light will come on and the buttons can be released; the dam will stay advanced under pressure. If the buttons are released (either button) before the light comes on, the dam will return to full open position.

Dam return switch—One push button that is held only until the indicator light goes off, the dam will then return on its own.

Options—Lights, fans etc. could be controlled either from the platform or from a floor panel.

Also to ensure operator safety and the safety of others in the plant, a suitable fume exhaust system is provided, and the use of personal protective equipment as well as positive pressure breathing apparatus by the human operator is stipulated.

This method is ideally suited to an assembly line for producing a high volume of product, with the advantage that non-standard shapes are easily accommodated, so that each wall section can be custom-made.

Because the interior of the wall is unfinished, no special care is required in handling the walls and moving them to the job site. Once the walls are erected, gypsum board or "drywall" can be installed on the interior surface of the wall in the conventional fashion. Minor abrasions or indentations to the wall will not affect the thermal characteristics and will be concealed by gypsum board or "drywall", when it is applied.

The above description relates to the preferred method and apparatus by way of example only. Many variations on the invention will be obvious to those knowledgeable in the field, and such obvious variations are within the scope of the invention, whether or not expressly described.

For example, as mentioned above the dam could be advanced and held in place by constant hydraulic force, though for the reasons specified above, holding at a fixed distance is superior.

Also, the rise of the dam could be continuous rather than step-wise, the rate of the rise being coordinated with the spray-pour rate to provide adequate dwell time.

Instead of single-cavity manual spray-pouring, a multiple-nozzle head could be used to spray several cavities at once, and/or the spraying itself could be automated. Either or both of these options would be especially feasible for standardized wall sections, rather than "custom" sections.

What is claimed as the invention is:

1. For filling a sheathing-backed, one-side-open stud wall with foam, a machine comprising:
   a main frame, including a substantially vertical backplate against which the sheathing bears;
   a dam parallel to the backplate, moveable towards and away from and vertically with respect to the backplate;
   means for holding the dam against the stud wall when the stud wall is positioned with its sheathin against the backplate, said means comprising hydraulic cylinders connected between the dam and the main frame, and wherein said hydraulic cylinders have adjustable end mounts whereby they may be set to reach their full extension with the dam at a distance from the backplate corresponding to the stud wall and sheathing thickness; and
   means for moving the dam vertically while it is so held against the stud wall;
   one side of said machine between the backplate and the dam defining an opening constituting a stud wall entrance area, and the other side of said machine between the backplate and the dam defining another opening constituting a stud wall exit area;
   whereby a stud wall may be introduced at the entrance area and positioned between the backplate and the dam, the dam may then be moved against a bottom portion of the open side of the stud wall and held there, foam may then be introduced between the backplate and the dam to fill the stud wall therebetween, the dam may then be moved upwardly, additional foam may then be introduced to fill a higher portion of the stud wall, and so on to completion of filling, whereupon the dam may then be moved away from the backplate, and the filled portion of the stud wall may then be advanced towards the exit area.

2. A machine as recited in claim 1, in which said means for holding the dam against the stud wall comprises a carrier unit carried on and moveable with respect to the main frame towards and away from the backplate, the dam being mounted on and moveable vertically with respect to the carrier unit, said hydraulic cylinders being positioned between the carrier unit and the main frame for actuating the carrier unit with respect to the main frame for holding the dam against the stud wall.

3. A machine as recited in claim 1, in which the holding means comprises at least two of said hydraulic cylinders positioned at each opposite end of the carrier unit.

4. A machine as recited in claim 1, in which the means for moving the dam vertically comprises at least two vertically-mounted hydraulic cylinders at opposite ends of the dam.

5. For filling a sheathing-backed, one-side-open stud wall with foam, a machine comprising:
   a main frame, including a substantially vertical backplate against which the sheathing bears;
   a dam parallel to the backplate, moveable towards and away from and vertically with respect to the backplate;
   means for holding the dam against the stud wall when the stud wall is positioned with its sheathing against the backplate, said means comprising a carrier unit carried on and moveable with respect to the main frame towards and away from the backplate, the dam being mounted on and moveable vertically with respect to the carrier unit, and actuation means positioned between the carrier unit and the main frame for actuating the carrier unit with respect to the main frame for holding the dam against the stud wall; and
   means for moving the dam vertically while it is so held against the stud wall;
   one side of said machine between the backplate and the dam defining an opening constituting a stud wall entrance area, and the other side of said machine between the backplate and the dam defining another opening constituting a stud wall exit area;
   whereby a stud wall may be introduced at the entrance area and positioned between the backplate and the dam, the dam may then be moved against a bottom portion of the open side of the stud wall and held there, foam may then be introduced between the backplate and the dam to fill the stud wall therebetween, the dam may then be moved upwardly, additional foam may then be introduced to fill a higher portion of the stud wall, and so on to completion of filling, whereupon the dam may then be moved away from the backplate, and the filled portion of the stud wall may then be advanced towards the exit area.

* * * * *